May 5, 1953 T. W. POTTER 2,637,604
JOURNAL BOX IMPACT HEAD AND DUST GUARD STRUCTURE
Filed Sept. 2, 1950 2 SHEETS—SHEET 1

INVENTOR,
THOMAS W. POTTER,
By Herbert A. Winturn
ATTORNEY.

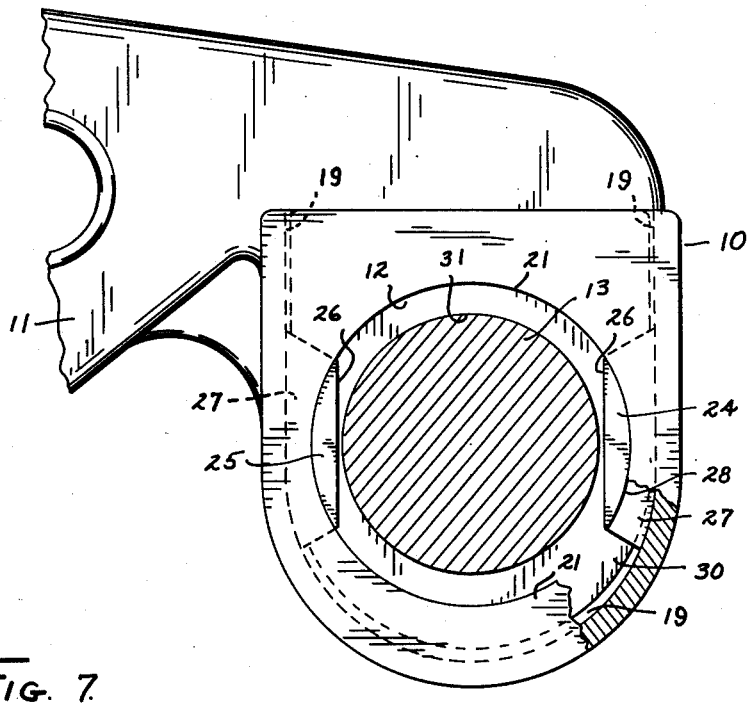
Fig. 3.
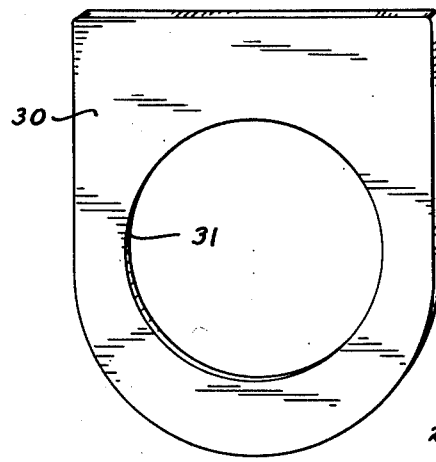
Fig. 7.
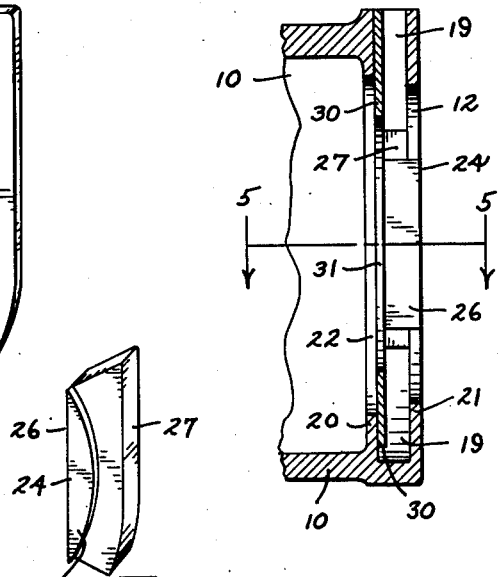
Fig. 4.
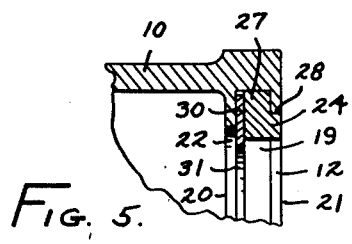
Fig. 5.
Fig. 6.
INVENTOR,
THOMAS W. POTTER,
By Herbert A. Newturn
ATTORNEY.

Patented May 5, 1953

2,637,604

UNITED STATES PATENT OFFICE 2,637,604

JOURNAL BOX IMPACT HEAD AND DUST GUARD STRUCTURE

Thomas W. Potter, Mattoon, Ill., assignor to Journal Box Servicing Corporation, Indianapolis, Ind., a corporation of Indiana Application September 2, 1950, Serial No. 182,914

3 Claims. (Cl. 308—80)

This invention relates to the art of journal boxes such as are employed in the rolling stock of railways, namely in freight cars, passenger cars, locomotives, and the like. A primary purpose of the invention is to provide a structure which will prevent the rocking and lifting of the bearings on the journals particularly due to sudden application of brakes against the wheels, particularly from the one-sided brakes, commonly employed.

The invention relates to that type of a journal box which is waste-packed. In the presence of waste, it is necessary that the bearing remain in contact at all times with the top side of the journal in order to prevent waste grabs which normally result in heated bearings.

A further primary object of the invention is to provide a structure which is applicable to the present constructions now in operation so that none of the present side frames of the car trucks need to be discarded, since the combination embodying my invention may be applied directly thereto.

A still further important object of the invention is to provide as light a weight of a dust guard as may be possibly used in order to prevent undue wear of that guard where it rests on the journal.

The invention comprises primarily the use of a pair of impact heads, one on each diametrical horizontal side of the axle to have these impact heads fixed in position, to extend within the dust guard receiving grooves and be permanently attached to the journal box in any such means such as by welding; and then to use a thinner than normal dust guard between the impact heads and the opposing rib defining the normal groove into which the dust guard is inserted.

By use of that primary structure, all of the heretofore complications of trying to incorporate removable impact heads in the dust guard itself, or in supplying separate impact heads around which the dust guard has to be formed and carried, is avoided. At the same time a very effective, durable, and low cost structure is provided to eliminate the difficulties heretofore encountered.

One particular form of the invention is illustrated in accompanying drawings, in which Fig. 1 is a view in outside end elevation of a journal box to which the invention is applied;

Fig. 3 is a vertical transverse section through the journal on the line 3—3 in Fig. 2;

Fig. 4 is a view in detail in vertical central longitudinal section through the rear portion of the journal box;

Fig. 5 is a detail in section on the line 5—5 in Fig. 4;

Fig. 6 is a view in rear perspective of an impact head; and

Fig. 7 is a view in perspective of a dust guard.

Figures 1, 2:
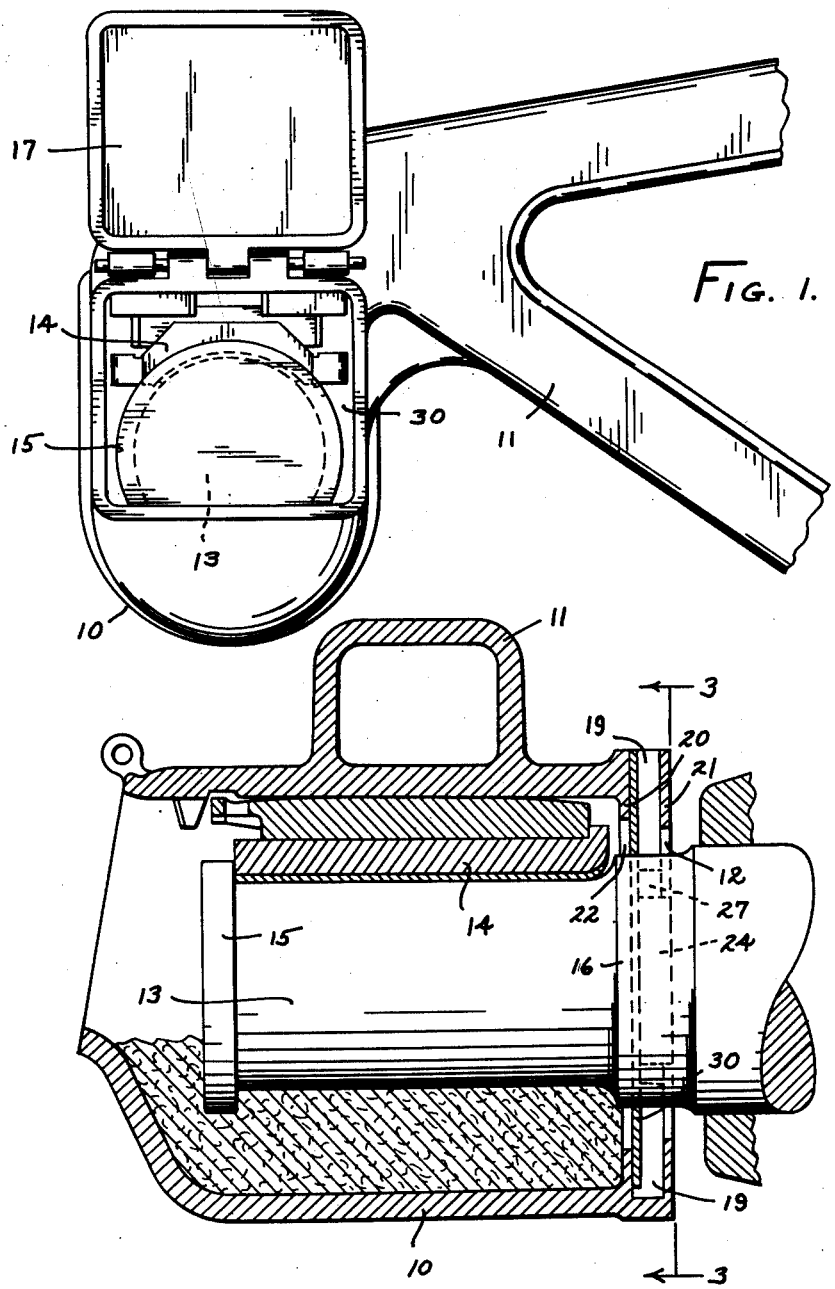
Fig. 2 is a view in vertical longitudinal section through the journal box.

The journal box structure herein illustrated in Figs. 1-3 represents the usual and well known construction. In this structure, the journal box 10 is an integral part of the side frame 11, and has an opening 12 through its back end to receive therethrough the journal 13 so that the journal 13 may extend within the box 10 sufficiently to receive the usual bearing 14 thereon behind the end collar 15 and the rear shoulder 16. The box 10 is provided in the usual manner with the outside cover 17.

The opening 12 is normally circular in contour and is of considerably larger diameter than that of the shoulder 16 in order to permit the box 10 to be jacked up for inspection or replacement of the bearing 14 as the case may be. Just within the opening 12, there is provided a generally U-shaped groove 19 entering from the top side of the box 10 and extending down around the outer wall thereof to terminate across the floor in a generally semi-circular manner. This groove 19 is defined by the front and rear ribs 20 and 21, the rib 21 having the circular opening 12 therethrough. The rib 20 has a somewhat larger opening 22 therethrough.

A pair of impact heads 24 and 25, each identical in size and shape, are formed to have an impact face 26 of a planar nature. From this face 26, the head in each instance extends by a body portion 27 which is formed to fit within the groove 19, along a side thereof horizontally disposed from the center of the journal 13. The width of the face 26 is made to be greater than the width of this body 27 so that there is provided a shoulder portion 28 which laps over and bears against the rib 21 through the hole 12.

The width of the body portion 27 is made to be less than the width of the groove 19. For example where the groove is ⅝ of an inch wide, the width of the body 27 will be approximately ½ of an inch. This will leave ⅛ of an inch clear between the side of the body 27 and the side of the rib 20 within the groove 19. As indicated in Fig. 4, the face 26 will have its one edge in alignment with the outer face of the rib 21, and its inner edge spaced from the rib 20 the distance indicated.

The vertical height of the face 26 is not critical, but it must be made to be sufficiently great to receive the impact of the shoulder 16 when it is thrown sidewise within the box 10 against that head when the application of brakes tend to throw the axle accordingly. What has been described in reference to the impact head 24 is to be applied to the mounting of the impact head 25 on the opposite side of the box. In both cases, the impact heads 24 and 25 are welded into position as indicated, and as shown in the drawings so that these impact heads become in reality a fixed, integral part of the journal box 10.

By reason of the width of the body 27, and also of the presence of the shoulder 28, the face 26 throughout its full area has a solid backing, first against the bottom of the groove 19, and secondly through the shoulder 28 against the edge of the rib 21. The impact heads 24 and 25 are thus held and aligned in the box 10 to have the shoulder 16 strike there against as the case may arise. The exact configuration of the upper and lower ends of the body 27 is immaterial, since there is nothing to interfere with the extension of those ends if desired.

Thus it is to be seen that the impact heads 24 and 25 may be attached to the journal box 10 already in use, simply by removing the side frame 11 and applying the heads as indicated. When the side frame 11 is returned to its truck, a dust guard generally designated by the numeral 30 is dropped down into the groove 19 from the upper side of the box 10 in the usual and well known manner. This dust guard 30 has a central circular hole 31 therethrough slidingly fitting around the shoulder 16 when the journal 13 is inserted through that hole and on into the box 10. The dust guard 30 rides on the shoulder 16 so that it is desirable to keep the weight of that guard to a minimum to prevent excess wear which would otherwise cause the hole 31 to wear upwardly into an elliptical shape.

In view of the fact that the bodies 27 occupy portions of the groove 19 on each side of the shoulder 16, it is necessary, as above indicated, to employ a thinner guard 30 than is normally employed. This means of course that the guard weight is reduced from the normal weight. This guard 30 may be made out of wood, plywood, or built up in the usual and well known manner out of fabric. The guard 30 is free to move up and down in the groove 19 alongside of the bodies 27 of the respective impact heads 24 and 25.

Thus it is to be seen that there are fixed impact heads, one on each side of the axle, independent of any movement with the dust guard itself, and at the same time, the dust guard can function in the usual and well known manner by riding within the groove 19 to keep in close running fit about the axle, and still have its marginal edge overlapped within the dust entrapping groove.

The parallel faces 26 define a vertical runway, in which the axle shoulder 16 may travel to have the shoulder be in close proximity to those faces at all times. This spacing apart of the faces 26 is normally substantially one thirty-second of an inch greater than the diameter of the shoulder 16.

While I have herein shown and described my invention in the one particular form, it is obvious that structural variations may be employed, such for example as reversing the positions of the impact heads 24 and 25 to have them bear against the inner rib instead of the outer rib to have the dust guard ride against the outer rib 21, and I therefore do not desire to be limited to that precise form beyond the limitations which may be imposed by the following claims.

I claim:

1. The combination with an axle having a journal, a journal box having a journal opening therein, through which said journal and a part of said axle back of the journal extends, a dust guard opening in the box above the journal opening, and spaced ribs extending from the guard opening around said journal opening to define a dust guard retaining groove between the ribs, of a pair of impact heads fixed to the journal box, one head on each side of the axle; each of said heads having a flat face directed toward the axle, a body extending from the face into abutment with said box; and a unitary dust guard having a hole therethrough, a margin of which hole freely fits around a portion of said axle to extend both below and above therefrom; and the outer edge portions of the guard entering said groove, to travel with said axle independently of said heads and float within the groove; said heads being carried by said box to be in the path of said axle part.

2. The combination with an axle having a journal, a journal box having a journal opening therein, through which said journal and a part of said axle back of the journal extends, a dust guard opening in the box above the journal opening, and spaced ribs extending from the guard opening around said journal opening to define a dust guard retaining groove between the ribs, of a pair of impact heads fixed to the journal box, one head on each side of the axle; each of said heads having a flat face directed toward the axle, a body extending from the face into abutment with said box; and a dust guard having a hole therethrough, the margin of which hole freely fits around a portion of said axle; and the outer edge portions of the dust guard entering said groove, to travel with said axle independently of said heads and float within the groove; said head bodies being shaped to enter said groove and rest against the bottom thereof, and said bodies having widths less than that of the groove to provide clearance for travel of the dust guard past the bodies within the groove; said heads being carried by said box to be in the path of said axle part.

3. The combination with an axle having a journal, a journal box having a journal opening therein, through which said journal and a part of said axle back of the journal extends, a dust guard opening in the box above the journal opening, and spaced ribs extending from the guard opening around said journal opening to define a dust guard retaining groove between the ribs, of a pair of impact heads fixed to the journal box, one head on each side of the axle; each of said heads having a flat face directed toward the axle, a body extending from the face into abutment with said box; and a dust guard having a hole therethrough, the margin of which hole freely fits around a portion of said axle; and the outer edge portions of the guard entering said groove, to travel with said axle independently of said heads and float within the groove; said head bodies being shaped to enter said groove and rest against the bottom thereof, and said bodies having widths less than that of the groove to provide clearance for travel of the dust guard past the bodies within the groove; and a shoulder overhanging from said body under the face in each of said heads, resting over and on one of said ribs; said heads being carried by said box to be in the path of said axle part.

THOMAS W. POTTER.

References Cited in the file of this patent

UNITED STATES PATENTS

| Number | Name | Date |
|---|---|---|
| 1,219,866 | Prescott | Mar. 20, 1917 |
| 1,223,649 | Williams | Apr. 24, 1917 |
| 2,445,597 | Bissell | July 20, 1948 |